(12) United States Patent
McMaster (10) Patent No.: US 6,520,415 B1
(45) Date of Patent: Feb. 18, 2003

(54) BARCODE READING DEVICE WITH PHOTODETECTOR ASSEMBLY INCLUDING A LENTICULAR ARRAY

(75) Inventor: Brian Monroe McMaster, Pittsford, NY (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/502,540

(22) Filed: Feb. 10, 2000

(51) Int. Cl.[7] ................................................. G02B 5/08

(52) U.S. Cl. .............................. 235/462.35; 235/462.01

(58) Field of Search ...................... 235/462.35, 462.33, 235/462.32, 462.01; 359/209, 619–628; 250/566

(56) References Cited

U.S. PATENT DOCUMENTS

| 2,209,747 A | | 7/1940 | Eisler | |
|---|---|---|---|---|
| 3,701,586 A | | 10/1972 | Goetz | |
| 5,717,221 A | * | 2/1998 | Li et al. | ................. 235/462.07 |
| 5,936,774 A | * | 8/1999 | Street | .......................... 359/619 |
| 6,073,851 A | * | 6/2000 | Olmstead et al. | ........... 235/454 |

* cited by examiner

Primary Examiner—Thien M. Le
Assistant Examiner—Lisa M. Caputo
(74) Attorney, Agent, or Firm—Stoel Rives LLP (57) ABSTRACT

A code scanner includes a laser beam generating a flying spot across a read axis of a code. The flying spot generates modulated reflected illumination that is detected by a photodetector assembly. The photodetector assembly includes a lenticular array with a plurality of lens elements and a mask with a plurality of horizontal mask space regions bounded by opaque regions to block a portion of ambient illumination and improve a signal to noise ratio.

53 Claims, 6 Drawing Sheets fig.1A fig.1B

BARCODE READING DEVICE WITH PHOTODETECTOR ASSEMBLY INCLUDING A LENTICULAR ARRAY

TECHNICAL FIELD

The present invention relates generally to bar code reading devices, and more particularly, staring collection optics for flying spot type barcode readers.

BACKGROUND OF THE INVENTION

In recent years, businesses in many industries including retail, manufacturing, transportation, and warehousing have encoded identification data into barcodes to facilitate identification and tracking of products in commerce.

Typically, an alphanumeric code identifying a particular product or container of products will be encoded into barcode symbol consisting of a plurality of contrasting parallel bars and spaces of varying widths. Barcode readers have been designed to read the barcode symbol and make the encoded identification data available to a computer system to which the barcode reader is connected.

One typical barcode reader architecture, commonly called a laser scanner, includes a laser illumination source providing a laser beam and an optic system for focusing the laser beam to a very narrow waist such that it provides a pin point spot of illumination on an object in the path of the beam. The laser beam is reflected from an oscillating or spinning scanning mirror which sweeps the beam and thus causes the spot of illumination to "fly" across a reading axis of the barcode. The parallel bars and spaces typically define a vertical axis and the read axis is generally perpendicular to the parallel bars and spaces such that it crosses all bars and spaces and generally defines a horizontal axis. As the spot of illumination flies across the parallel bars and spaces, the dark bars generally absorb the illumination while the light colored spaces generally reflect the illumination such that modulated reflected illumination is reflected from the code during the time period while the spot flies across the parallel bars and spaces. The modulation is a function of the spot speed, spot size, and the width of each bar and space.

A staring photodetector, which has a field of view that encompasses the read axis of the barcode, detects the modulated reflected illumination and generates a modulated electrical signal corresponding to the modulated reflected illumination. Signal processing and decoding circuitry operate to decode the electrical signal from the photodetector and provide the alphanumeric data to a computer system coupled thereto. While a laser scanner using a scanning mirror is the most common architecture for generating a flying spot for reading a barcode, alternatives include moving the entire laser illumination source to generate a flying spot across the reading axis of the barcode.

A problem associated with flying spot type barcode readers is that the photodetector, in addition to detecting the modulated reflected illumination, also detects ambient illumination which degrades the signal to noise ratio of the electrical signal and degrades the performance of the reader.

Figure 1A:
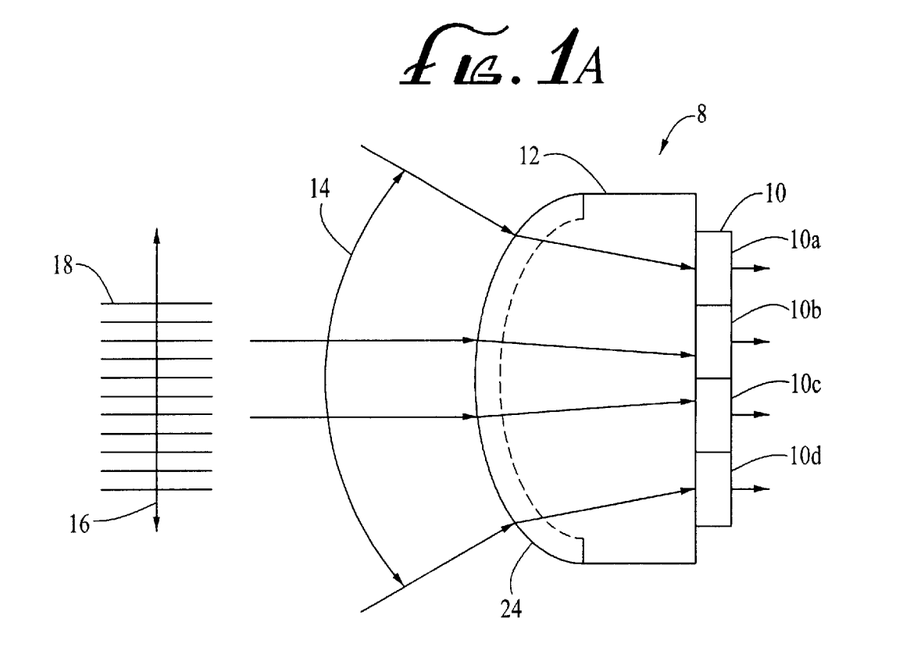
FIG. 1(a) is a top view of a conventional staring photodetector assembly for a code scanner.
Figure 1B:
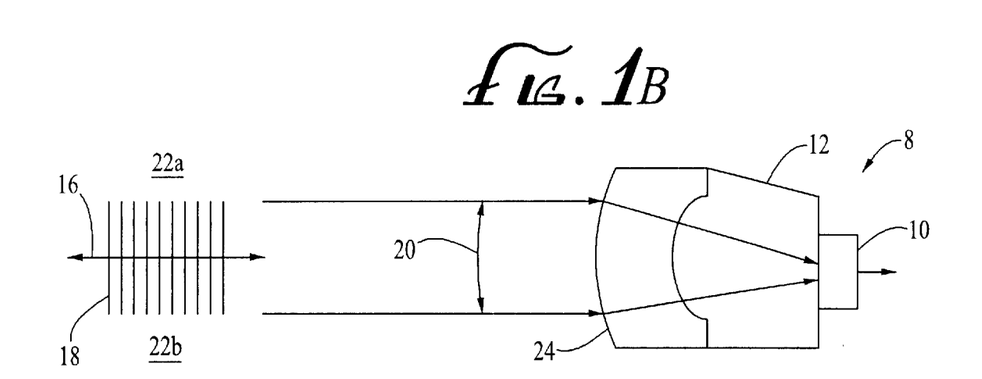
FIG. 1(b) is a side view of the conventional staring photodetector assembly of FIG. 1(a)

To improve signal to noise ratio, optics can be used to limit the field of view of the staring photodetector to a narrow rectangular region surrounding the reading axis of the code to reduce the amount of ambient illumination from regions above and below the read axis that is detectable by the photodetector. An example of such a limited field of view system 8 is shown in FIGS. 1(a) and 1(b). Photodetector 10 includes a plurality of photodetectors 10(a)–(d) and is positioned behind an optic 12. Referring to FIG. 1(a) which is a top view of the system 8, optic 12 functions to gather illumination from a wide horizontal field of view 14 which entirely encompasses read axis 16 through code 18. Referring to FIG. 1(b), which is a side view of the system 8, optic 12 functions to gather illumination from a narrow vertical field of view 20, again encompassing the entire read axis 16, but not encompassing regions 22(a) and 22(b) above and below the code 18. As such, ambient illumination from regions 22(a) and 22(b) does not contribute to ambient illumination noise on the photodetector 10. In known solutions, the optic surface 24 of optic 12 is toroidal and is large enough so that photodetector 10 defines the optical aperture of the system 8 (e.g. how much of the light reflected from the laser beam spot can be gathered and reflected onto the photodetector). A problem associated with existing rectangular field of view systems is that because the optic is large enough for the photodetector to define the optical aperture, the size and weight of the optic hinder the design of extremely compact barcode reading solutions for portable applications.

Another solution to improve signal to noise ratio is a retro-reflective architecture. In a retro-reflective device, mirrors and/or lenses are used to limit the field of view of the photodetector to an area significantly smaller than the entire read axis of the barcode. An oscillating or spinning collection mirror than sweeps the field of view of the photodetector in unison with the flying spot to detect the reflected illumination. The oscillating or spinning collection mirror typically defines the optical aperture of the system and therefore must be large enough to gather enough light to provide for an improved signal to noise ratio over a staring system. Problems associated with retro-reflective systems are size, cost, complexity, and power consumption associated with a system in which a large collection mirror spins or oscillates.

What is needed is a flying spot barcode reading system that provides for a strong signal to noise ratio but does not suffer the disadvantages of size, cost, complexity, and power consumption of known retro-reflective barcode scanner and does not suffer the disadvantages of size and weight associated with known limited field of view staring systems.

SUMMARY OF THE INVENTION

A first object of this invention is to provide a code scanner comprising a flying spot illumination source sweeping an intense spot of illumination across a scan axis of a code to generate a modulated reflected illumination and a photodetector assembly for receiving the modulated reflected illumination from a code. The photodetector includes: i) a photosensor; ii) a lenticular array positioned between the photosensor and the code and including a plurality of lens elements for refracting illumination, including the modulated reflected illumination and ambient illumination; and iii) a mask positioned between the photosensor and the lenticular array blocking at least a portion of the ambient illumination from impinging on the photosensor.

In a first embodiment, the plurality of lens elements are horizontal lens elements arranged in a vertical array and the mask includes a plurality of horizontal mask elements, the horizontal mask elements being interlaced between the plurality of horizontal lens elements. The plurality of horizontal lens elements may be on a front surface of the lenticular array facing the code.

The plurality of horizontal mask elements define a plurality of horizontal spaces in alignment with the plurality of horizontal lens elements and defining a vertical field of view from which illumination originating in the vertical field of view is generally refracted towards a horizontal space and illumination originating outside of the vertical field of view is generally refracted towards a horizontal mask element. Each lens element has a curvature defining a focal point, the focal point may be positioned behind the mask.

In one sub embodiment, the mask is an illumination absorbing coating on a back surface of the lenticular array. In a second sub embodiment, the mask is a planar material including the plurality of horizontal spaces positioned therein and the mask is spaced apart from the back surface of the lenticular array. In a third sub embodiment, the lenticular array is a molded optic material and the photosensor and mask are embedded therein.

In a second embodiment, the plurality of lens elements are arranged in a two dimensional array and the mask defines a plurality of horizontal space regions each bounded a light blocking region, each space region defining a vertical field of view from which illumination originating in the vertical field of view is generally refracted towards a horizontal space region and illumination originating outside of the vertical field of view is generally refracted towards the light blocking region. The plurality of lens elements maybe on a front surface of the lenticular array facing the code and each horizontal space region may be positioned behind a lens element. Each lens element has a curvature defining a focal point, the focal point may be positioned behind the mask.

In one sub embodiment, the mask is an illumination absorbing coating on a back surface of the lenticular array. In a second sub embodiment, the mask is a planer material including the plurality of horizontal spaces positioned therein and the mask is spaced apart from the back surface of the lenticular array. In a third sub embodiment, the lenticular array is a molded optic material and the photosensor and mask are embedded therein.

A second objective of the present invention is to provide a photodetector assembly for detecting illumination from a field of view, comprising: a) a photosensor; b) a lenticular array positioned in front of the photosensor including an array of lens elements; and c) a mask positioned between the photosensor and the lenticular array blocking at least a portion of the illumination from impinging on the photosensor.

In a first embodiment, the plurality of lens elements are horizontal lens elements arranged in a vertical array and the mask includes a plurality of horizontal mask elements, the horizontal mask elements being interlaced between the plurality of horizontal lens elements. The plurality of horizontal lens elements are on a front surface of the lenticular array facing the code. The plurality of horizontal mask elements define a plurality of horizontal spaces in alignment with the plurality of horizontal lens elements and defining a vertical field of view from which illumination originating in the vertical field of view is generally refracted towards a horizontal space and illumination originating outside of the vertical field of view is generally refracted towards a horizontal mask element. Each lens element has a curvature defining a focal point, the focal point may be positioned behind the mask.

In one sub embodiment, the mask is an illumination absorbing coating on a back surface of the lenticular array. In a second sub embodiment, the mask is a planar material including the plurality of horizontal spaces positioned therein and the mask is spaced apart from the back surface of the lenticular array. In a third sub embodiment, the lenticular array is a molded optic material and the photosensor and mask are embedded therein.

In a second embodiment, the plurality of lens elements are arranged in a two dimensional array and the mask defines a plurality of horizontal space regions each bounded a light blocking region, each space region defining a vertical field of view from which illumination originating in the vertical field of view is generally refracted towards a horizontal space region and illumination originating outside of the vertical field of view is generally refracted towards the light blocking region. The plurality of lens elements may be on a front surface of the lenticular array facing the code and each horizontal space region may be positioned behind a lens element. Each lens element has a curvature defining a focal point, the focal point may be positioned behind the mask.

In one sub embodiment, the mask is an illumination absorbing coating on a back surface of the lenticular array. In a second sub embodiment, the mask is a planer material including the plurality of horizontal spaces positioned therein and the mask is spaced apart from the back surface of the lenticular array. In a third sub embodiment, the lenticular array is a molded optic material and the photosensor and mask are embedded therein.

A third objective of the present invention is to provide a lenticular array comprising a front surface including an array of horizontal lens elements and an opaque mask including an array of horizontal mask elements positioned behind the front surface, the array of horizontal mask elements being interlaced between the array of horizontal lens elements. Each lens element has a curvature defining a focal point, the focal point may be positioned behind the mask.

In one sub embodiment, the mask is an illumination absorbing coating on a back surface of the lenticular array. In a second sub embodiment, the mask is a planer material including the plurality of horizontal spaces positioned therein and the mask is spaced apart from the back surface of the lenticular array. In a third sub embodiment, the lenticular array is a molded optic material and the photosensor and mask are embedded therein.

A fourth objective of the present invention is to provide a method of reading a code comprising: a) illuminating the code with a point of illumination sweeping across a sweep axis of the code to generate modulated reflected illumination; b) refracting illumination from a field of view towards a photosensor with an array of a plurality of refractive lens elements, the field of view having a width encompassing the sweep axis and a height less than the width; and c) refracting illumination from a region above and a region below the field of view towards an illumination blocking mask. In one embodiment, the plurality of refractive lens elements are horizontal lens elements arranged in a vertical array and in a second embodiment the plurality of refractive lens elements are circular lens elements arranged in a two dimensional array.

DESCRIPTION OF THE PREFERRED EMBODIMENTS

The present invention will now be described in detail with reference to the drawings. In the drawings, like reference numerals are used to refer to like elements throughout.

Figure 2:
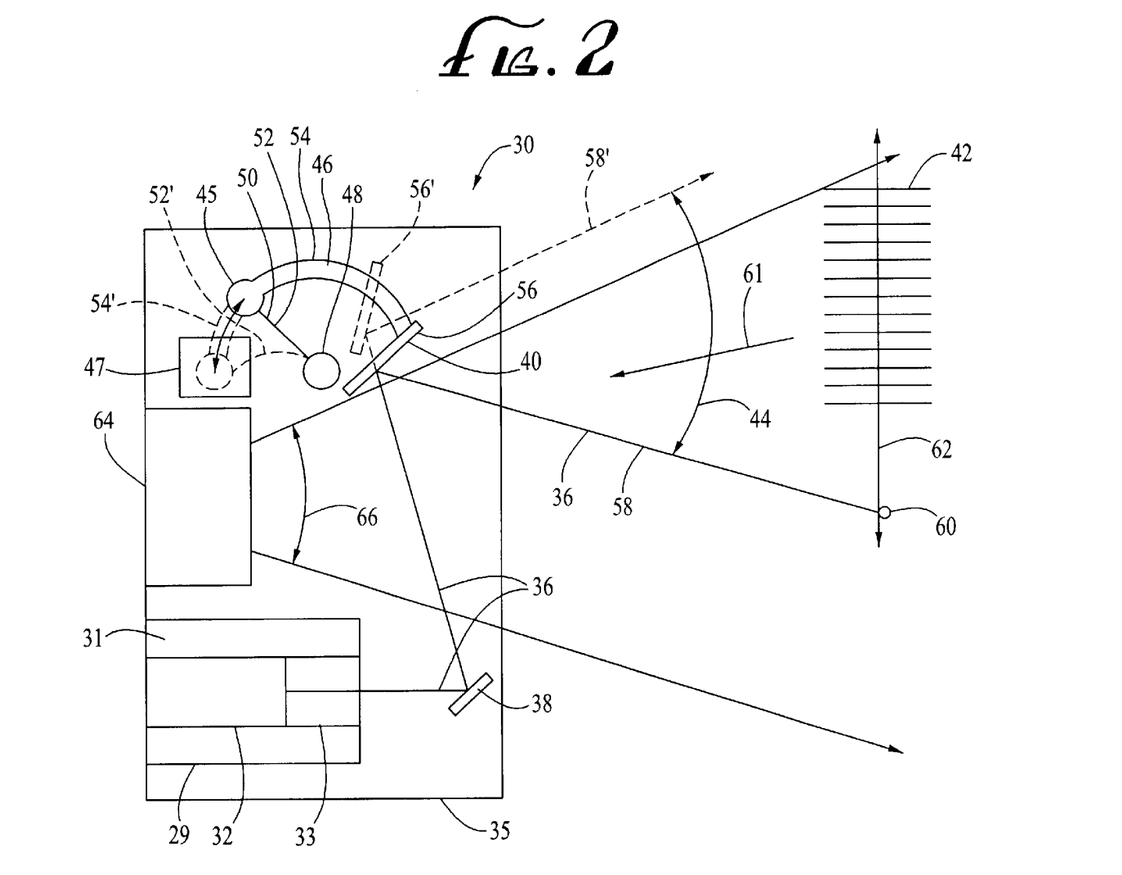
FIG. 2 is a top view of a code scanning module in accordance with one embodiment of this invention.

Referring to FIG. 2, a top view of a barcode reading module 30 is shown in accordance with a preferred embodiment of this invention. Module 30 preferably utilizes a laser scanner architecture including a laser illumination assembly 29 generating a laser beam 36. Laser illumination assembly 29 typically includes a laser diode 32 generating the laser beam 36 and optics 33, in the path of laser beam 36, for shaping a waist size of the laser beam 36 to produce a fine spot within a working range of module 30. The laser diode 32 and optics 33 are mounted in a case 31 which preferably is metal or some other highly thermally conductive material to dissipate heat generated by laser diode 32. Laser beam 36 is reflected from fixed mirror 38 towards scanning mirror 40 and is reflected from scanning mirror 40 towards a barcode 42 in the field of view 44 of module 30. In the preferred embodiment, the scanning mirror 40 is attached to a support 46 which in turn is attached to a base 48 via a plastic flexure 50 which is made from polyester film or other suitable plastic. A magnetic portion 45 of the support 46 interacts with an electromagnetic coil 47. Electromagnetic coil 47 operates to pull support 46 from position 54 to position 54' and deflect flexure 50 from position 52 to position 52'. In operation, electromagnetic coil is driven by an A/C waveform to cause support 46 to oscillate between position 54 and position 54' and thus cause scanning mirror 40 to oscillate between position 56 and position 56' such that the laser beam 36, reflecting from scanning mirror 40, sweeps across field of view 44 in a corresponding oscillating motion between position 58 and position 58'. Accordingly, the fine spot of illumination 60 formed by the shaped waist of the laser beam 36 flies across the read axis 62 of code 42 in a corresponding oscillating motion. Modulated reflected illumination 61, which is illumination reflected from flying spot 60 and is modulated as a function of the speed at which spot 60 flies across read axis 62, the size of the spot of illumination 60, and the widths of the contrasting bars and spaces comprising code 42, reflects back towards reader module 30. Each of the laser illumination assembly 29, fixed mirror 38, base 48, and coil 47 are mounted to a chassis 35 to maintain alignment therebetween.

It should be appreciated that the above described structure of supporting an oscillating mirror on a single flexure provides for linear acceleration of the mirror between points 56 and 56' as only the torsion of the flexure and the driving force of the coil effect acceleration. A disadvantage of such a single flexure system is that the oscillating mirror must be displaced from the pivot point and therefore the spot at which the laser beam intersects the oscillating mirror moves with respect to the mirror and as such the mirror must be large enough to accommodate the movement during the oscillations.

An alternative structure could provide for a scanning mirror to be mounted on a rotating shaft supported by low friction journals. This structure would provide for a smaller scanning mirror because it could pivot at the point where the laser beam intersects. However, impurities between the rotating shaft and the journals can cause an additional jerk (e.g. derivative of acceleration) effecting the linearity of the acceleration of the scanning mirror.

A staring photodetector assembly 64, also secured to the chassis 35, gathers illumination reflected from a horizontal field of view 66 which encompasses the read axis 62 of the code 42 such that the modulated reflected illumination 61 is within the horizontal field of view 66 and can be detected by the photodetector assembly 64. The output of the photodetector assembly 64 is then input to appropriate signal processing and decoding circuitry and/or microprocessors as is known in the art.

Figure 3:
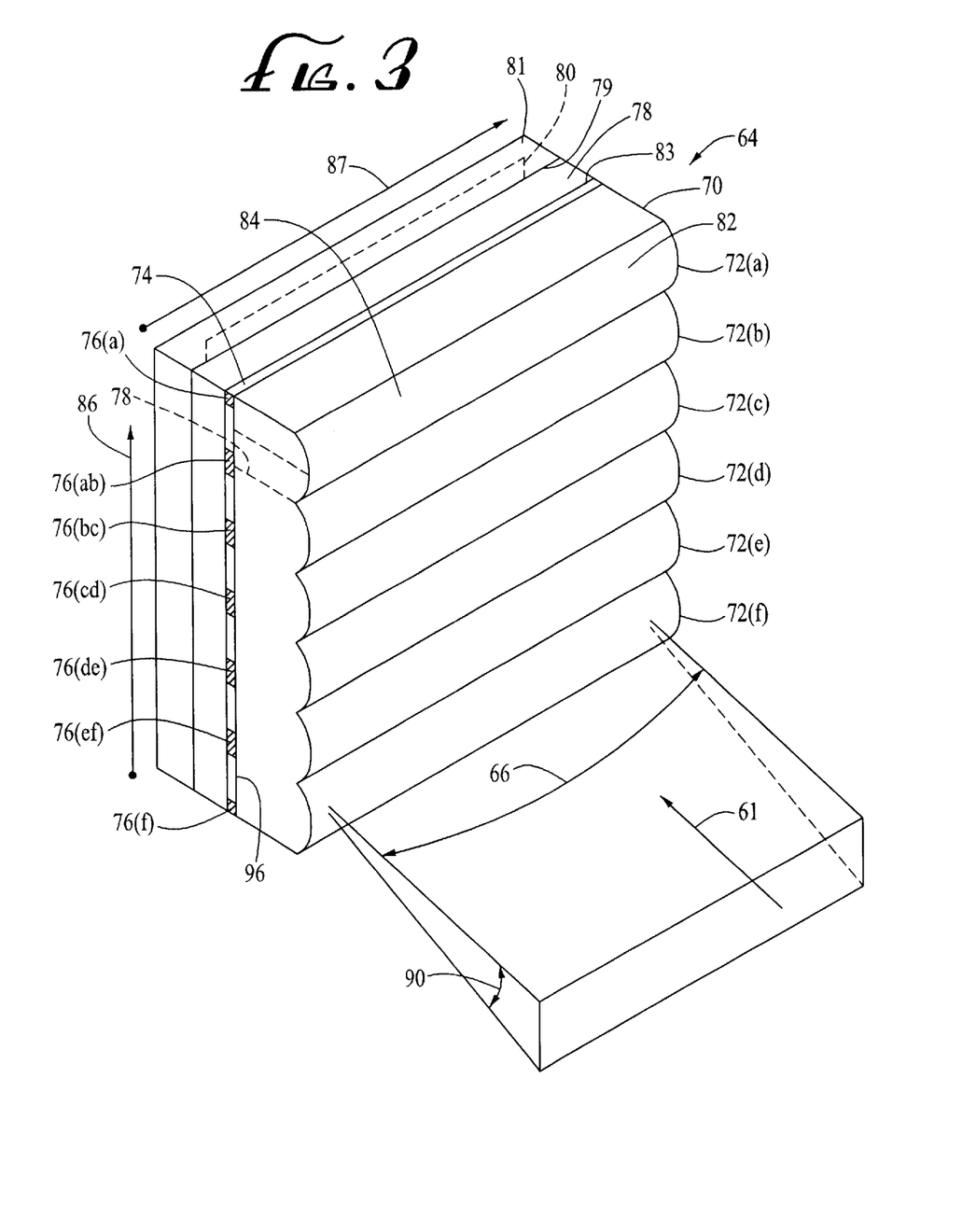
FIG. 3 is a perspective view of a staring photodetector assembly in accordance with a first embodiment of this invention.

Referring to FIG. 3, a perspective view of one embodiment of the staring photodetector assembly 64 is shown. The photodetector assembly 64 includes a photosensor 80 which, in the preferred embodiment is a light sensitive silicon compound encased in a plastic package 81. A narrow band filter 78 is positioned to the front of the plastic package 81 and functions to pass the spectral frequency of the modulated reflected illumination 61 (which is generally normal to the vertical axis 86 and the horizontal axis 87 of the photodetector assembly 64) while blocking ambient illumination of other wavelengths. In the preferred embodiment, the filter 78 includes a substrate 79 with a plurality of thin film coatings 83 with band pass characteristics centered at the wavelength of the modulated reflected illumination. Positioned to the front of the narrow band filter 78 is a lenticular array 70. The lenticular array 70 includes a front surface 84 comprising a plurality of horizontal lens elements 72(a)–(f). The lenticular array 70 preferably is a molded optical plastic, such as polycarbonate, but could be any optic material which is molded, ground, or otherwise formed into lenticular array 70. A mask 74 includes a plurality of horizontal mask portions 76(a), 76(ab), 76(bc), 76(cd), 76(de), 76(ef) and 76(f) defining a plurality of horizontal spaces 92(a)–(f) (FIG. 4) therebetween. In the preferred embodiment, the mask 74 comprises an opaque coating that is applied directly to the back surface 96 of the lenticular array 70. However, the mask may alternatively comprise an opaque thin metal or plastic structure that is aligned and positioned between the lenticular array 70 and the filter 78. Because each of the horizontal lens elements 72, horizontal mask portions 76, and horizontal spaces 92 are the same, the discussion herein will be with respect to the reference numeral only without the alpha subscript and it is to be understood that such discussion applies to all elements with the same reference numeral.

Each horizontal mask portion 76 is interlaced between two adjacent horizontal lens elements 72 and generally masks a horizontal region corresponding to the intersection 73 of the two adjacent horizontal lens elements 72. As will be discussed in more detail, each horizontal lens element 72 in combination with two adjacent horizontal mask portions 76 define a narrow vertical field of view 90 and a wide horizontal field of view 66.

Figure 4:
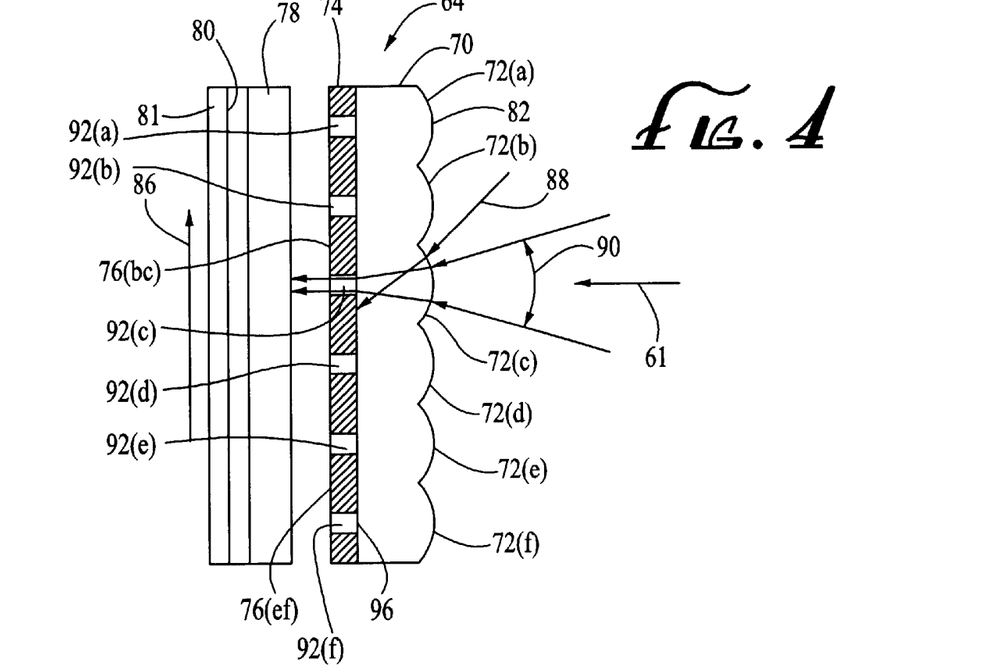
FIG. 4 is a side view of the staring photodetector assembly of FIG. 3.

Referring to FIG. 4, a side view of the photodetector assembly 64 is shown. Each lens element 72 has a curvature 82, which in the preferred embodiment is cylindrical but could be parabolic or any other complex curvature known to those skilled in the art of optic design. Modulated reflected illumination 61 which is generally normal to the vertical axis 86 of photodetector assembly 64 will be refracted by lens element 72 to pass through an opening 92 and through a narrow band filter 78 and be absorbed by photosensor 80 and converted to a modulated electrical signal. However, off-axis ambient illumination 88 which is outside of the vertical field of view 90 will be refracted by lens element 72 towards a horizontal mask element 76 and will be absorbed thereby and will not be detected by photosensor 80.

It should be appreciated that the size of the opening 92 between two adjacent horizontal mask elements 76 and the curvature 82 of the lens elements 72 define the narrow vertical field of view 90 and it should be appreciated that alignment of the horizontal mask elements 76 to interlace between adjacent horizontal lens elements 72 is critical to the performance of this system. To make this system more tolerant to misalignment and to spacing variations, the curvature 82 is selected such that its focal point is behind a back surface 96 of the lenticular array 70 and mask 74.

Figure 5:
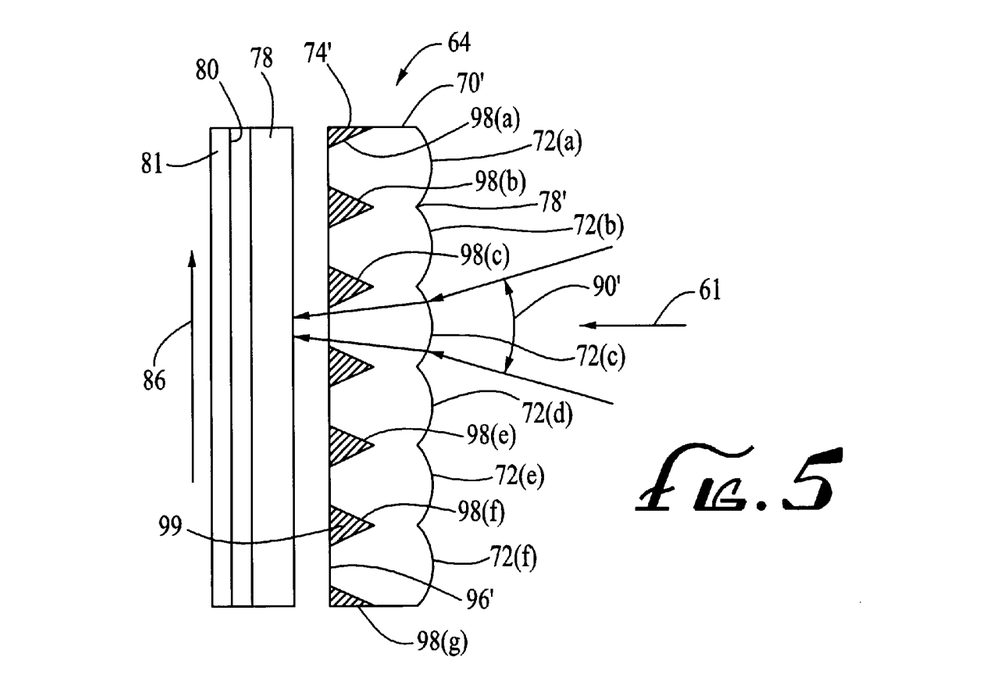
FIG. 5 is a side view of a staring photodetector assembly in accordance with a second embodiment of this invention.

FIG. 5 shows an alternative embodiment of photodetector assembly 64 in which a lenticular array 70', again including a vertical array of a plurality of horizontal lens elements 72', includes mask 74' embedded therein. Lenticular array 70' includes a plurality recesses 98 formed in the back surface 96' each of which is interlaced between two adjacent horizontal lens elements 72'. Each recess 98 is filled with a light absorbing material 99 which generally masks a horizontal region corresponding to the intersection 78' of the two adjacent horizontal lens elements 72'. In the preferred embodiment, each recess 98 is "V" shaped, however alternative shapes may be known to those skilled in the art of optic design based on the optic properties of the lenticular array 70', the light absorbing material 99 and the design goal of absorbing off-axis illumination. As discussed previously with respect to the embodiment of FIG. 4, each horizontal lens element 72' in combination with the horizontal spaces 96' define a narrow vertical field of view 90' from which illumination may be reflected towards photodetector 80. The remainder of the components in this embodiment are the same as the like reference numeral components described with respect to FIG. 4 and therefore a repetitive discussion with respect to FIG. 5 is eliminated for sake of brevity. However, it should be appreciated that the plurality of thin film coatings comprising filter 78 may be applied to the back surface of lenticular array 70'.

Figure 6:
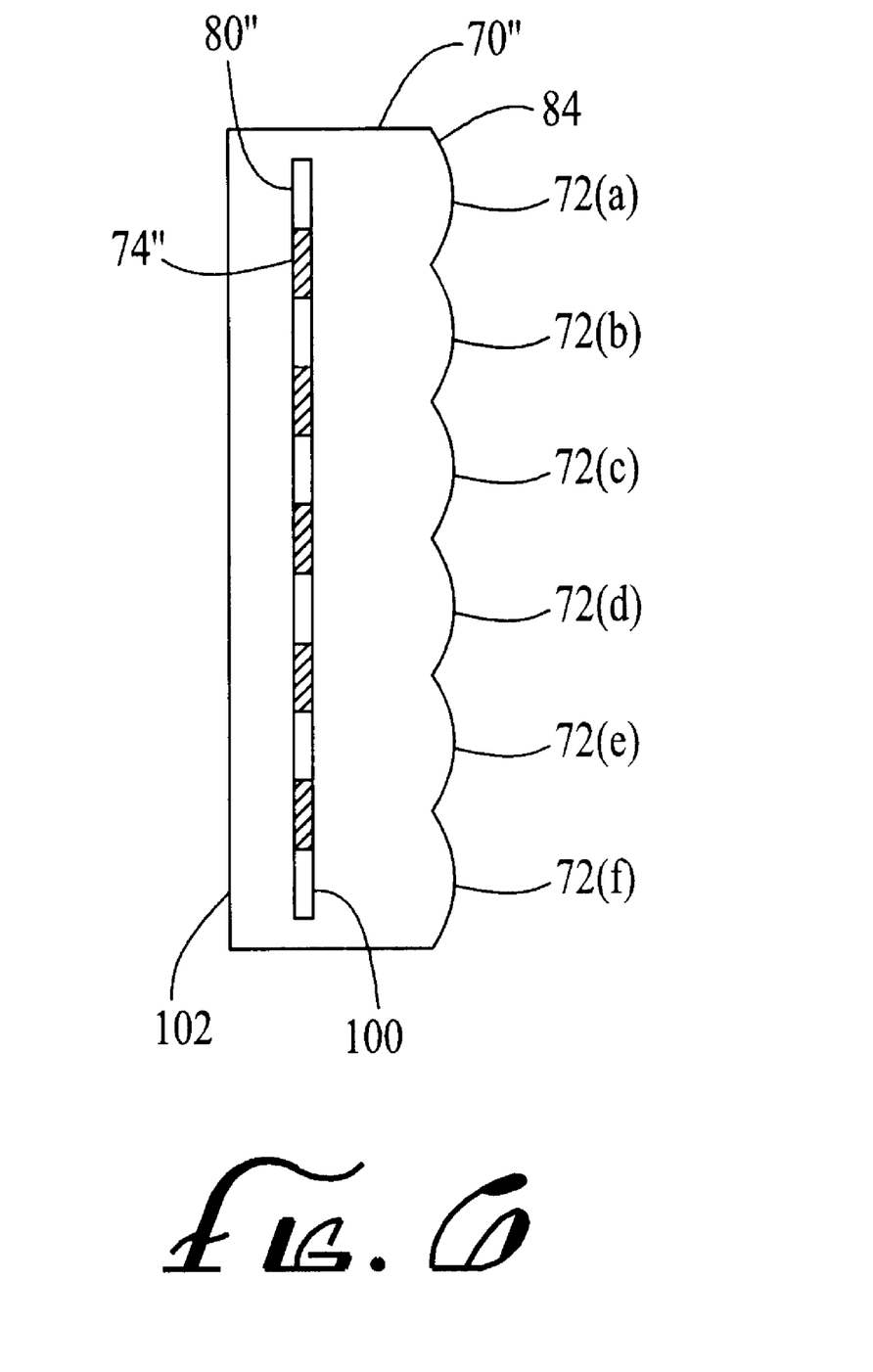
FIG. 6 is a side view of a staring photodetector assembly in accordance with a third embodiment of this invention.

FIGS. 6 shows a side view of another alternative embodiment of a photodetector assembly 64 in accordance with this invention. In this embodiment, photosensor 80" is not encased in a plastic package, but is encased in lenticular array 70". Mask 74" may be a light absorbing material coated onto the photodetector 80" or onto an intermediate surface 100 to which photodetector 80" abuts. Alternatively, a mask 74" made of metal, plastic or another opaque material may be aligned with and encased in lenticular array 70" between the photodetector 80" and the front surface 84. Again, the remainder of the components in this embodiment are the same as the like reference numeral components described with respect to FIG. 4 and therefore a repetitive discussion with respect to FIG. 5 is eliminated for sake of brevity.

Figures 7A, 7B:
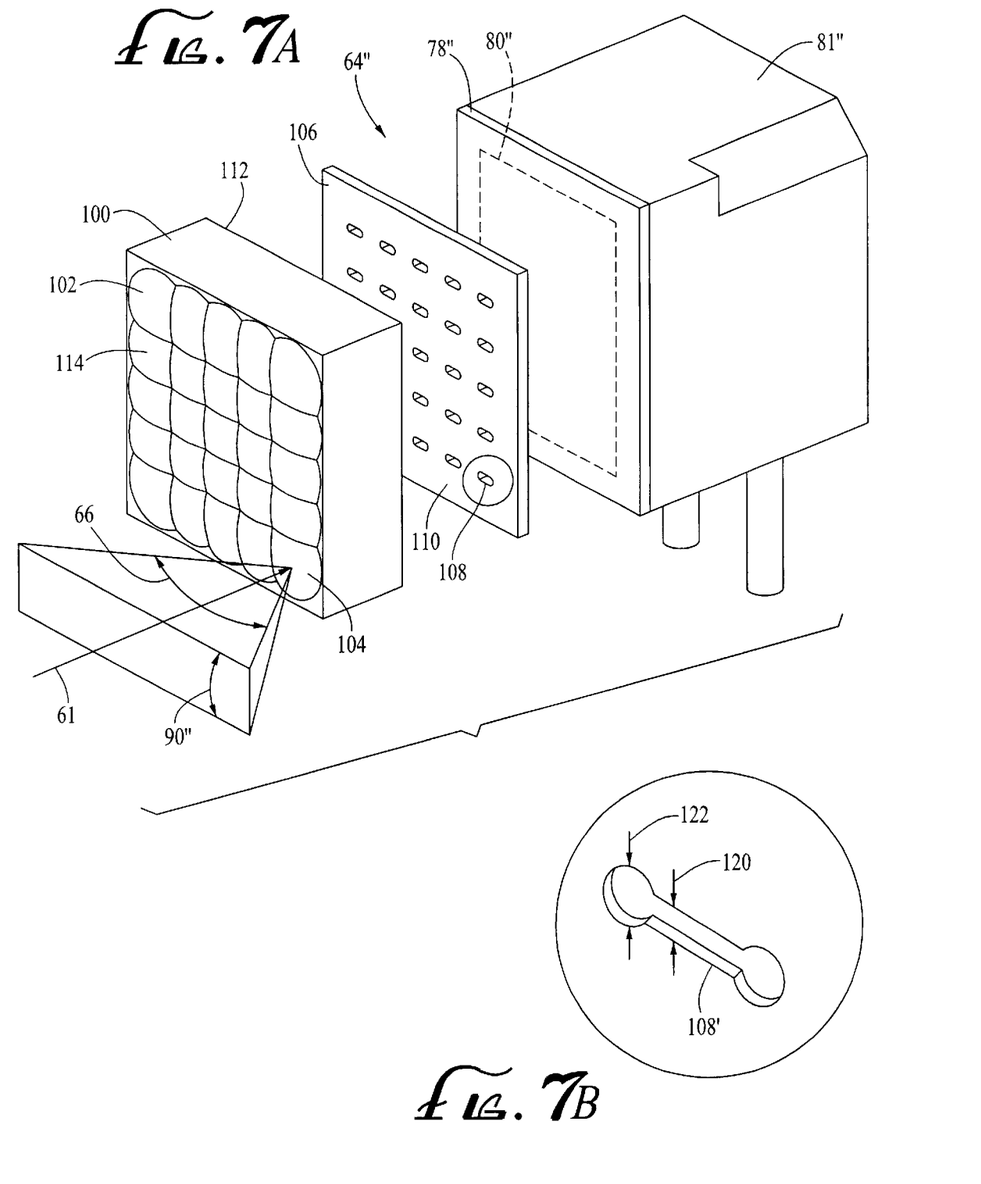
FIG. 7(a) is a perspective view of a staring photodetector assembly in accordance with a fourth embodiment of the invention.
FIG. 7(b) is a detailed view of an alternate space region from the one illustrated in FIG. 7(a).

Referring to FIG. 7(a), a perspective view of another embodiment of the staring photodetector assembly 64" is shown. The photodetector assembly 64" includes a photosensor 80" which, in the preferred embodiment is a light sensitive silicon encased in a plastic package 81". A narrow band filter 78" is positioned to the front of the plastic package 81" and functions to pass the spectral frequency of the modulated reflected illumination 61 while blocking ambient illumination of other wavelengths. In the preferred embodiment, the filter 78" includes a substrate with a plurality of thin film coatings with gaussian band pass characteristics centered at the wavelength of the modulated reflected illumination. Positioned to the front of the narrow band filter 78" is a lenticular array 100. The lenticular array 100 includes a front surface 102 comprising two dimensional array of lens elements 104. In the preferred embodiment, the two dimensional array is a matrix array pattern, however, other array patterns including, but not limited to, concentric radials are envisioned by this invention. The lenticular array 100 may be a molded optical plastic such as polycarbonate or any other optic material that can be molded, ground, or otherwise formed into lenticular array 100. A mask 106 includes a plurality of horizontal space regions 108 bounded by light blocking, or opaque, regions 110. It should be appreciated that the light blocking regions 110 encompass the entire area of the mask 106 except for the horizontal space regions 108. Each of the space regions 108 has a horizontal dimension greater than a vertical dimension and is positioned behind a corresponding lens element 104. The vertical dimension of each space region 108 defines a vertical field of view from which reflected illumination 61 will be directed through the space region 108 to photosensor 80". Illumination originating from a region above the field of view or below the field of view will generally be directed to a light blocking regions 110. As such, the vertical dimension of space region 108 defines the optical aperture of photosensor 80".

In the preferred embodiment, the mask 106 comprises an opaque coating that is applied directly to the back surface 112 of the lenticular array 100. However, the mask may alternatively comprise an opaque thin metal or plastic structure that is aligned and positioned between the lenticular array 100 and the filter 78".

Each lens element 104 has a curvature 114, which in the preferred embodiment is spherical but could be parabolic or any other complex curvature known to those skilled in the art of optic design. Modulated reflected illumination 61 which is generally normal to the vertical axis of photodetector assembly 64" will be refracted by lens element 104 to pass through an space region 108 and through narrow band filter 78" and be absorbed by photosensor 80' and converted to a modulated electrical signal. However, off-axis ambient illumination which is outside of the vertical field of view 90" will be refracted by lens element 104 towards an opaque region 110 of mask 106 and will be absorbed thereby and will not be detected by photosensor 80".

Referring to FIG. 7(b), an alternative embodiment of the horizontal space regions 108' is shown. Space region 108' is bar bell shaped such that the vertical dimension 120 in the center of the horizontal space region 108' is smaller than the vertical dimension 122 at the ends of the horizontal space region 108'. It should be appreciated that lens element 104 will refract illumination from the center of the horizontal field of view towards the center of horizontal space region 108' and will refract illumination from the edges of the horizontal field of view towards the ends of horizontal space region 108'. As the vertical dimension 122 is larger than the vertical dimension 120, the vertical field of view at the ends of the horizontal field of view will be greater than the vertical field of view in the center of the horizontal field of view. This relationship will tend to compensate for the fact that the reflected illumination is more intense in the center of the horizontal field of view leveling the average intensity of illumination incident on the photosensor 80".

It should be appreciated that the size of the space region 108, its alignment behind a lens element 104, and the curvature 114 of the lens elements 104 define the narrow vertical field of view 90 and it should be appreciated that alignment of the mask 106 behind lenticular array is critical to the performance of this embodiment of this invention. To make this invention more tolerant to misalignment and to spacing variations, the curvature 114 is selected such that its focal point is behind a back surface 112 of the lenticular array 100 and mask 106.

It should also be appreciated the various structures for aligning and securing a mask to a lenticular array as discussed with reference to FIGS. 4, 5, and 6 are applicable to this embodiment discussed with reference to FIG. 7.

It should be appreciated that the teachings of this invention provide for a bar code reader module with a limited field of view staring photosensor assembly that has a thin lenticular array and does not suffer the disadvantages of size and weight associated with known limited field of view staring barcode readers and does not suffer the disadvantages of size, complexity, cost, and power consumption of known retro-reflective bar code readers.

Although the invention has been shown and described with respect to certain preferred embodiments, it is obvious that equivalents and modifications will occur to others skilled in the art upon the reading and understanding of the specification. For example, the refractive optics of the lenticular array may readily be replaced with defractive optics providing similar optical properties. The present invention includes all such equivalents and modifications, and is limited only by the scope of the following claims.

What is claimed is:

1. A code scanner comprising:
   a) a flying spot illumination source sweeping an intense spot of illumination across a scan axis of a code to generate a modulated reflected illumination; and
   b) a photodetector assembly for receiving the modulated reflected illumination from a code including:
      i) a photosensor;
      ii) a lenticular array positioned between the photosensor and the code and including a plurality of lens elements for refracting illumination, including the modulated reflected illumination and ambient illumination; and
      iii) a mask positioned between the photosensor and the lenticular array blocking at least a portion of the ambient illumination from impinging on the photosensor, wherein the mask comprises a plurality of mask elements with a mask element corresponding to each lens element.

2. A code scanner comprising:
   a) a flying spot illumination source sweeping an intense spot of illumination across a scan axis of a code to generate a modulated reflected illumination; and
   b) a photodetector assembly for receiving the modulated reflected illumination from a code including:
      i) a photosensor;
      ii) a lenticular array positioned between the photosensor and the code and including a plurality of lens elements for refracting illumination, including the modulated reflected illumination and ambient illumination; and
      iii) a mask positioned between the photosensor and the lenticular array blocking at least a portion of the ambient illumination from impinging on the photosensor,
   wherein the plurality of lens elements are horizontal lens elements arranged in a vertical array and the mask includes a plurality of horizontal mask elements, the horizontal mask elements being interlaced between the plurality of horizontal lens elements.

3. The code scanner of claim 2, wherein the plurality of horizontal lens elements are on a front surface of the lenticular array facing the code.

4. The code scanner of claim 3, wherein the plurality of horizontal mask elements defines a plurality of horizontal spaces in alignment with the plurality of horizontal lens elements and defining a vertical field of view from which illumination originating in the vertical field of view is generally refracted towards a horizontal space and illumination originating outside of the vertical field of view is generally refracted towards a horizontal mask element.

5. The code scanner of claim 4, wherein each lens element has a curvature defining a focal point, the focal point being positioned behind the mask.

6. The code scanner of claim 5, wherein the mask is an illumination absorbing coating on a back surface of the lenticular array.

7. The code scanner of claim 5, wherein the mask is a planar material including the plurality of horizontal spaces positioned therein and the mask is spaced apart from the back surface of the lenticular array.

8. The code scanner of claim 5, wherein the lenticular array is a molded optic material and the photosensor and mask are embedded therein.

9. A code scanner comprising:
   a) a flying spot illumination source sweeping an intense spot of illumination across a scan axis of a code to generate a modulated reflected illumination; and
   b) a photodetector assembly for receiving the modulated reflected illumination from a code including:
      i) a photosensor;
      ii) a lenticular array positioned between the photosensor and the code and including a plurality of lens elements for refracting illumination, including the modulated reflected illumination and ambient illumination; and
      iii) a mask positioned between the photosensor and the lenticular array blocking at least a portion of the ambient illumination from impinging on the photosensor,
   wherein the plurality of lens elements are arranged in a two dimensional array and the mask defines a plurality of horizontal space regions each bounded a light blocking region, each space region defining a vertical field of view from which illumination originating in the vertical field of view is generally refracted towards a horizontal space region and illumination originating outside of the vertical field of view is generally refracted towards the light blocking region.

10. The code scanner of claim 9, wherein the plurality of lens elements are on a front surface of the lenticular array facing the code and each horizontal space region is positioned behind a lens element.

11. The code scanner of claim 10, wherein each lens element has a curvature defining a focal point, the focal point being positioned behind the mask.

12. The code scanner of claim 11, wherein the mask is an illumination absorbing coating on a back surface of the lenticular array.

13. The code scanner of claim 11, wherein the mask is a planar material including the plurality of horizontal spaces positioned therein and the mask is spaced apart from the back surface of the lenticular array.

14. The code scanner of claim 11, wherein the lenticular array is a molded optic material and the photosensor and mask are embedded therein.

15. A photodetector assembly for detecting illumination from a field of view, comprising:
 a) a photosensor;
 b) a lenticular array positioned in front of the photosensor including an array of lens elements; and
 c) a mask positioned between the photosensor and the lenticular array blocking at least a portion of the illumination from impinging on the photosensor, wherein the mask comprises a plurality of mask elements with a mask element corresponding to each lens element.

16. A photodetector assembly for detecting illumination from a field of view, comprising:
 a) a photosensor;
 b) a lenticular array positioned in front of the photosensor including an array of lens elements; and
 c) a mask positioned between the photosensor and the lenticular array blocking at least a portion of the illumination from impinging on the photosensor,
 wherein the plurality of lens elements are horizontal lens elements arranged in a vertical array and the mask includes a plurality of horizontal mask elements, the horizontal mask elements being interlaced between the plurality of horizontal lens elements.

17. The photodetector assembly for detecting illumination from a field of view of claim 16, wherein the plurality of horizontal lens elements are on a front surface of the lenticular array facing the code.

18. The photodetector assembly for detecting illumination from a field of view of claim 17, wherein the plurality of horizontal mask elements defines a plurality of horizontal spaces in alignment with the plurality of horizontal lens elements and defining a vertical field of view from which illumination originating in the vertical field of view is generally refracted towards a horizontal space and illumination originating outside of the vertical field of view is generally refracted towards a horizontal mask element.

19. The photodetector assembly for detecting illumination from a field of view of claim 18, wherein each lens element has a curvature defining a focal point, the focal point being positioned behind the mask.

20. The photodetector assembly for detecting illumination from a field of view of claim 19, wherein the mask is an illumination absorbing coating on a back surface of the lenticular array.

21. The photodetector assembly for detecting illumination from a field of view of claim 19, wherein the mask is a planar material including the plurality of horizontal spaces positioned therein and the mask is spaced apart from the back surface of the lenticular array.

22. The photodetector assembly for detecting illumination from a field of view of claim 19, wherein the lenticular array is a molded optic material and the photosensor and mask are embedded therein.

23. A photodetector assembly for detecting illumination from a field of view, comprising:
 a) a photosensor;
 b) a lenticular array positioned in front of the photosensor including an array of lens elements; and
 c) a mask positioned between the photosensor and the lenticular array blocking at least a portion of the illumination from impinging on the photosensor,
 wherein the plurality of lens elements are arranged in a two dimensional array and the mask defines a plurality of horizontal space regions each bounded a light blocking region, each space region defining a vertical field of view from which illumination originating in the vertical field of view is generally refracted towards a horizontal space region and illumination originating outside of the vertical field of view is generally refracted towards the light blocking region.

24. The photodetector assembly for detecting illumination from a field of view of claim 23, wherein the plurality of lens elements are on a front surface of the lenticular array facing the code and each horizontal space region is positioned behind a lens element.

25. The photodetector assembly for detecting illumination from a field of view of claim 24, wherein each lens element has a curvature defining a focal point, the focal point being positioned behind the mask.

26. The photodetector assembly for detecting illumination from a field of view of claim 25, wherein the mask is an illumination absorbing coating on a back surface of the lenticular array.

27. The photodetector assembly for detecting illumination from a field of view of claim 25, wherein the mask is a planar material including the plurality of horizontal spaces positioned therein and the mask is spaced apart from the back surface of the lenticular array.

28. The photodetector assembly for detecting illumination from a field of view of claim 25, wherein the lenticular array is a molded optic material and the photosensor and mask are embedded therein.

29. A lenticular array comprising:
 a) a front surface including an array of horizontal lens elements; and
 b) an opaque mask including an array of horizontal mask elements positioned behind the front surface, the array of horizontal mask elements being interlaced between the array of horizontal lens elements.

30. The lenticular array of claim 29, wherein each lens element has a curvature defining a focal point, the focal point being positioned behind the mask.

31. The lenticular array of claim 30, wherein the mask is an illumination absorbing coating on a back surface of the lenticular array.

32. The lenticular array of claim 30, wherein the mask is a planar material including the plurality of horizontal spaces positioned therein and the mask is spaced apart from the back surface of the lenticular array.

33. The lenticular array of claim 30, wherein the lenticular array is a molded optic material and the photosensor and mask are embedded therein.

34. A method of reading a code comprising:
 a) illuminating the code with a point of illumination sweeping across a sweep axis of the code to generate modulated reflected illumination;
 b) refracting illumination from a field of view towards a photosensor with an array of a plurality of refractive lens elements, the field of view having a width encompassing the sweep axis and a height less than the width;
 c) refracting illumination from a region above and a region below the field of view towards an illumination blocking mask;
 d) collecting light from each of the lens elements and producing a signal corresponding to a sum of light collected from all the lens elements.

35. A method of reading a code comprising:
a) illuminating the code with a point of illumination sweeping across a sweep axis of the code to generate modulated reflected illumination;
b) refracting illumination from a field of view towards a photosensor with an array of a plurality of refractive lens elements, the field of view having a width encompassing the sweep axis and a height less than the width; and
c) refracting illumination from a region above and a region below the field of view towards an illumination blocking mask,
wherein the plurality of refractive lens elements are horizontal lens elements arranged in a vertical array.

36. A method of reading a code comprising:
a) illuminating the code with a point of illumination sweeping across a sweep axis of the code to generate modulated reflected illumination;
b) refracting illumination from a field of view towards a photosensor with an array of a plurality of refractive lens elements, the field of view having a width encompassing the sweep axis and a height less than the width; and
c) refracting illumination from a region above and a region below the field of view towards an illumination blocking mask,
wherein the plurality of refractive lens elements are circular lens elements arranged in a two dimensional array.

37. The code scanner of claim 1 wherein light is collected light from each of the lens elements at the photosensor, the photosensor producing a signal corresponding to a sum of light collected from all the lens elements.

38. The code scanner of claim 1 wherein light collected through each lens element corresponds to the same code element being collected by the other lens elements.

39. The code scanner of claim 1 wherein the mask comprises a coating on a back surface of the lenticular array.

40. The code scanner of claim 1 wherein each lens element has a curvature defining a focal point, the focal point being positioned behind the mask.

41. The code scanner of claim 1 wherein the lenticular array is a molded optic material and the photosensor and mask are embedded therein.

42. The code scanner of claim 1 wherein the plurality of lens elements are on a front surface of the lenticular array facing the field of view.

43. The code scanner of claim 1 wherein the lenticular array comprises a plurality of horizontal lens elements arranged in a vertical array.

44. The code scanner of claim 1 wherein the lenticular array comprises a plurality of circular lens elements arranged in a two dimensional array.

45. The photodetector assembly of claim 15 wherein light is collected light from each of the lens elements at the photosensor, the photosensor producing a signal corresponding to a sum of light collected from all the lens elements.

46. The photodetector assembly of claim 15 wherein light collected through each lens element corresponds to the same code element being collected by the other lens elements.

47. The photodetector assembly of claim 15 wherein the mask comprises a coating on a back surface of the lenticular array.

48. The photodetector assembly of claim 15 wherein each lens element has a curvature defining a focal point, the focal point being positioned behind the mask.

49. The photodetector assembly of claim 15 wherein the lenticular array is a molded optic material and the photosensor and mask are embedded therein.

50. The photodetector assembly of claim 15 wherein the plurality of lens elements are on a front surface of the lenticular array facing the field of view.

51. The photodetector assembly of claim 15 wherein the lenticular array comprises a plurality of horizontal lens elements arranged in a vertical array.

52. The photodetector assembly of claim 15 wherein the lenticular array comprises a plurality of circular lens elements arranged in a two dimensional array.

53. A method according to claim 34 wherein the mask comprises a plurality of mask elements with a mask element corresponding to each lens element for partially blocking ambient light though that lens element.

\* \* \* \* \*

UNITED STATES PATENT AND TRADEMARK OFFICE
CERTIFICATE OF CORRECTION

PATENT NO. : 6,520,415 B1
DATED : February 18, 2003
INVENTOR(S) : Brian Monroe McMaster It is certified that error appears in the above-identified patent and that said Letters Patent is hereby corrected as shown below:

Column 3,
Line 18, after "bounded" insert -- by --.
Line 24, "maybe" should read -- may be --.
Line 31, "planer" should read -- planar --.

Column 4,
Line 5, after "bounded" insert -- by --.
Lines 18 and 34, "planer" should read -- planar --.

Column 8,
Line 30, "a light blocking" should read -- light blocking --.
Line 45, "an space" should read -- a space --.

Column 9,
Line 8, "this invention" should read -- the invention --.
Line 9, after "this" insert -- embodiment of the --.

Column 12,
Line 3, after "bounded" insert -- by --.

Signed and Sealed this

Thirtieth Day of March, 2004

JON W. DUDAS
*Acting Director of the United States Patent and Trademark Office*